(12) United States Patent
Hojyo et al.

(10) Patent No.: US 6,715,376 B2
(45) Date of Patent: Apr. 6, 2004

(54) STRUCTURE FOR TRANSMITTING POWER OF A MOTORCYCLE ENGINE, AND A METHOD FOR ASSEMBLY OF SAID STRUCTURE

(75) Inventors: Atsuo Hojyo, Saitama (JP); Hiroatsu Inui, Saitama (JP); Naoki Kohno, Saitama (JP); Fumiaki Okubo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 87 days.

(21) Appl. No.: 09/949,754

(22) Filed: Sep. 12, 2001

(65) Prior Publication Data

US 2002/0033063 A1 Mar. 21, 2002

(30) Foreign Application Priority Data

Sep. 12, 2000 (JP) ........................................ 2000-277065

(51) Int. Cl.$^7$ ............................................... B60K 17/04
(52) U.S. Cl. ..................... 74/414; 74/573 R; 123/197.1; 123/192.2
(58) Field of Search ........................... 74/413–414, 440, 74/443, 573 R; 123/197.4, 192.2, 197.1

(56) References Cited

U.S. PATENT DOCUMENTS

| 4,470,379 A | * | 9/1984 | Miyakoshi et al. ........ 123/59.6 |
| 4,622,934 A | * | 11/1986 | Oyama ..................... 123/197.4 |
| 5,078,105 A | * | 1/1992 | Ito et al. .................. 123/195 R |
| 6,334,422 B1 | * | 1/2002 | Sumi et al. ............. 123/196 R |

FOREIGN PATENT DOCUMENTS

| JP | 4-25642 | * | 1/1992 |
| JP | 6-171381 | * | 6/1994 |
| JP | 7-54134 |   | 6/1995 |
| JP | 7-94859 |   | 10/1995 |
| JP | 2002-195387 | * | 7/2002 |

* cited by examiner

Primary Examiner—William C. Joyce
(74) Attorney, Agent, or Firm—Birch, Stewart, Kolasch & Birch, LLP

(57) ABSTRACT

A structure for transmitting the power of a motorcycle engine includes an intermediate shaft arranged between a crankshaft and an input shaft of a transmission, and a method for making the structure. The structure and the method have the objective of shortening the distances between these three shafts, improving workability of assembling, and providing freedom of setting a speed reduction ratio. An intermediate shaft driven gear and an intermediate shaft driving gear having a diameter smaller than the intermediate shaft driven gear and are mounted in two steps, with the former overlaid on the latter, on an end of the intermediate shaft projecting outside a right case. Similarly, the intermediate shaft driven gear is engaged with a primary gear of the crankshaft, and the intermediate shaft driving gear is engaged with a primary driven gear of the input shaft at a location outside the right case.

12 Claims, 2 Drawing Sheets

STRUCTURE FOR TRANSMITTING POWER OF A MOTORCYCLE ENGINE, AND A METHOD FOR ASSEMBLY OF SAID STRUCTURE

BACKGROUND OF THE INVENTION

1. Field of the Invention

The present invention relates to a structure for transmitting the power of an engine in a motorcycle or the like and, in particular, to the structure in which an intermediate shaft is interposed between a crankshaft and the main input shaft of a transmission. The invention also relates to a process for assembling said structure.

2. Description of Background Art

A structure for transmitting the power of an engine using such an intermediate shaft is already publicly known and, for example, Japanese Examined Patent Publication No. 7-54134 discloses a structure in which an intermediate shaft driven gear and an intermediate shaft driving gear are disposed on an intermediate shaft and in which the intermediate shaft driven gear is engaged with the driving gear of a crankshaft inside a crankcase, and in which the intermediate driving gear is engaged with the input gear of the input shaft of a transmission outside the crankshaft, and in which a balancer weight is integrally formed inside the crankcase of the intermediate shaft.

Further, Japanese Examined Patent Publication No. 7-94859 discloses a power transmission structure in which an idle gear is arranged at the end portion projecting outside the crankcase of an intermediate shaft, and is engaged with both the driving gear of a crankshaft and the input gear of the input shaft of a transmission, which are disposed outside the crankcase.

In this connection, when an intermediate shaft driven gear and a intermediate shaft driving gear are disposed on an intermediate shaft inside and outside the crankcase, as disclosed in Japanese Examined Patent Publication No. 7-54134, many man hours are required for assembly. Thus, it would be desirable to improve workability of assembly. Further, if a balancer weight is mounted on the intermediate shaft inside the crankcase, restrictions are introduced into the layout, depending on the presence or absence of a clearance between the balancer web and a crank web. Therefore, it would be desirable to provide an improved structure capable of increasing the layout flexibility and of producing a greater balancing effect.

Further, if a gear disposed on the intermediate shaft is used only as an idle gear, as Japanese Examined Patent Publication No. 7-94859 discloses, a free speed reduction ratio cannot be obtained and the distance between the intermediate shaft and the input shaft of the transmission is inevitably made greater.

The object of the present invention is to solve these problems.

SUMMARY AND OBJECTS OF THE INVENTION

In order to solve the problem described above, a first element of the present invention comprises a crankshaft, an intermediate shaft, an input shaft of a transmission, and an output shaft of the transmission, wherein these respective shafts are supported by a crankcase, characterized in that an intermediate shaft driven gear and an intermediate shaft driving gear are mounted adjacently in the axial direction on a right end of the intermediate shaft at a location outside the crankcase, and that the intermediate shaft driven gear is engaged with the driving gear of the crankshaft, and that the intermediate shaft driving gear is similarly engaged with an input gear of the input shaft of the transmission, also in a position outside the crankcase.

The present invention is also characterized in that at least one balancer weight is mounted on the left end of the intermediate shaft, which projects outside the crankcase.

In addition, the present invention is characterized in that a sub-gear having the same diameter as the intermediate shaft driven gear is overlaid on the intermediate shaft driven gear, and that a spring for turning both the gears in the opposite direction is disposed between both the gears to form a canceling structure. The intermediate shaft driving gear is also formed in the canceling structure, and has a sub-gear similar to the sub-gear of the intermediate driven gear. All four of these gears are butted together and held in place by a washer and nut, fixing all of these gears in a thrust direction.

In the present invention, the intermediate shaft driven gear and the intermediate shaft driving gear are disposed on the intermediate shaft outside the crankcase. Therefore, it is possible to mount all of the shafts, namely the crankshaft, the intermediate shaft, the main input shaft of the transmission, and the output shaft of the transmission, on the crankcase, and then to easily mount all of the gears for transmitting the power from one of these shafts to another at positions outside the crankcase. This configuration results in improved in workability of assembly of the members involved. Further, since the intermediate shaft driven gear and the intermediate shaft driving gear are mounted on the intermediate shaft in two steps, it is possible to freely set a speed reduction ratio. Moreover, the configuration of this invention shortens the distance between the intermediate shaft and the crankshaft, and the distance between the intermediate shaft and the input shaft of the transmission.

In the present invention, since the balancer weight is disposed on the intermediate shaft at the portion projecting outside the crankcase, unlike conventional embodiments in which the balancer weight is disposed inside the crankcase, the balancer weight can be mounted without regard for the clearance between itself and a crank web, thereby increasing layout flexibility. In addition, since the balancer weight is mounted at the position away from the center of the engine, it is possible to produce a greater effect for regulating lateral vibrations.

In the present invention, each of the intermediate shaft driven gear and the intermediate shaft driving gear is formed in a canceling structure, with each gear having a sub-gear. All four of these gears are then butted together and fixed in the thrust direction by means of a simple washer and nut, eliminating the need for a special fixing structure, and hence simplifying the structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
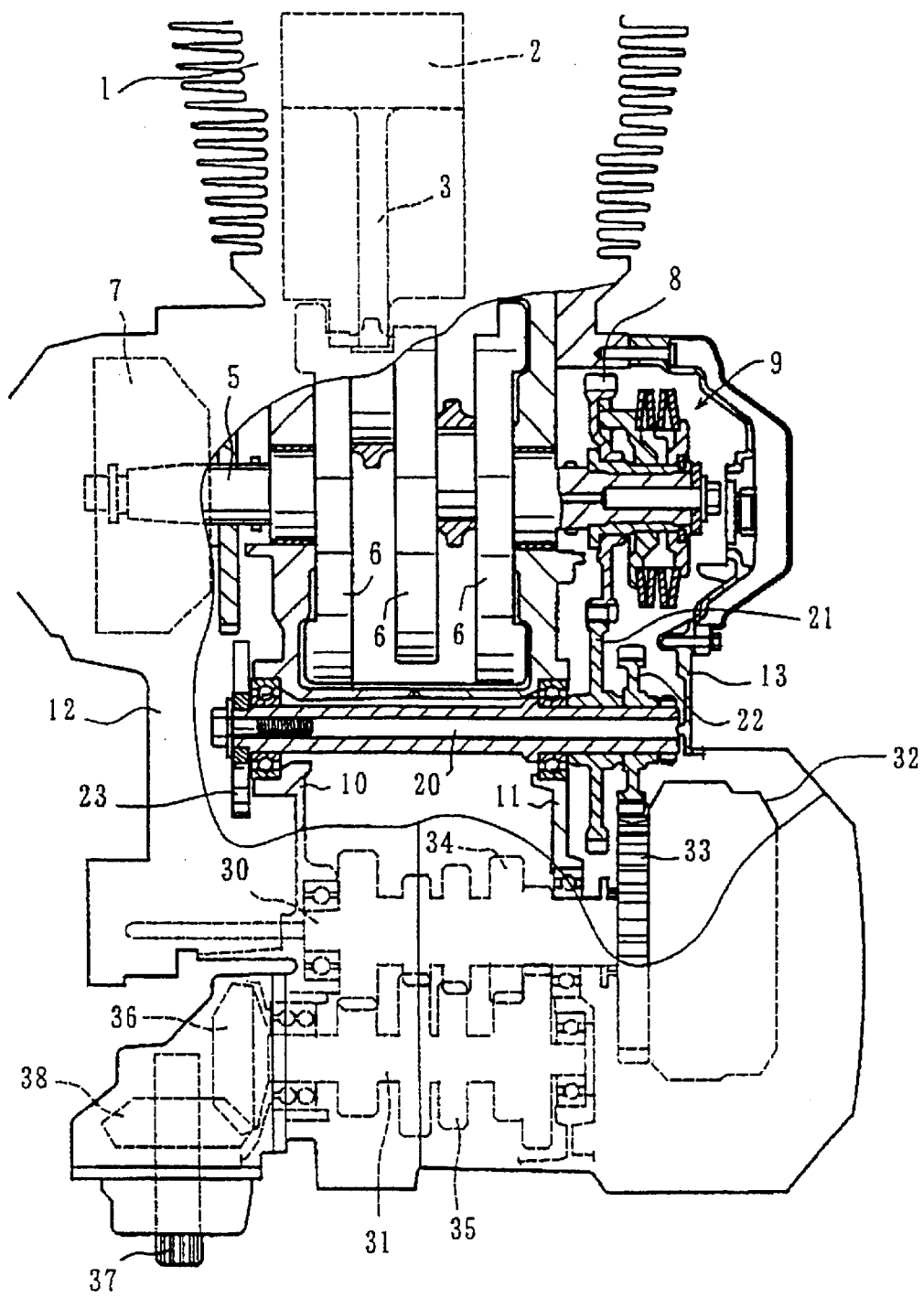
FIG. 1 is a partially cutaway view of an engine in accordance with the first preferred embodiment.

A first embodiment will be described in the following on the basis of FIG. 1, which shows a partially cutaway view of an engine to show a structure for transmitting the power of a V-shaped engine for a motorcycle. In FIG. 1, a V-shaped engine 1 is provided and includes a piston 2, a connecting rod 3, a crankshaft 5, and a crank web 6. On the one end of the crankshaft 5 is mounted a generator 7 and on the other end thereof are mounted a primary gear 8 and a primary damper 9 which is a torque damper.

The crankshaft 5 is supported by a left case 10 and a right case 11 which constitute a crankcase. A reference numeral 12 designates a left case cover and a reference numeral 13 designates a right case cover. An intermediate shaft 20 is disposed in parallel to the crankshaft 5, and an intermediate shaft driven gear 21 engaging with the primary gear 8 is mounted on the end portion of the intermediate shaft 20 projecting outside the right case 11 and an intermediate driving gear 22 having a diameter smaller than the intermediate shaft driven gear 21 is mounted adjacently thereto in two steps in the axial direction.

Further, a balancer weight 23 is mounted on the other end portion of the intermediate shaft 20 projecting outside the left case 10. The balancer weight 23 is constituted as a primary balancer for reducing the coupling vibrations (lateral vibrations caused by couple of forces) of the crankshaft 5.

Further, a main shaft 30, which is the input shaft of a transmission, and a counter shaft 31, which is the output shaft of the transmission, are mounted in parallel to the intermediate shaft 20. A clutch 32 is mounted on the portion of the main shaft 30 projecting outside the right case 11 and a primary driven gear 33 connected to the outer side of the clutch 32 is engaged with the intermediate shaft driving gear 22. The inner side of the clutch 32 is connected to the main gear train 34 on the main shaft 30, and power is intermittently transmitted from the primary driven gear 33, which is the input gear, to the main gear train 34 by the intermittent engagement of the clutch 32.

The main gear train 34 is always engaged with the counter gear train 35 on the counter shaft 31 and when a speed change operation is selected by means of a publicly known shift mechanism, a variable speed is applied to a bevel gear 36, which is an output gear, mounted on the one end of the counter shaft 31. The bevel gear 36 is engaged with a bevel bear 38 of an output shaft 37 connected to a driving shaft (not shown) to drive a driving wheel such as a rear wheel or the like by a shaft driving operation.

Next, the action of the present preferred embodiment will be described. The intermediate shaft driven gear 21 and the intermediate shaft driving gear 22 are mounted adjacently to each other in the axial direction on the intermediate shaft 20 at the portion of projecting outside the right case 11. Therefore, when assembling this engine, first, the shafts (5, 20, 30, 31) are assembled between the left case 10 and the right case 11 so that they support both the cases 10, 11. Then, the primary gear 8 and the primary damper 9 are mounted on the crankshaft 5 outside the right case 11, and the intermediate shaft driven gear 21 and the intermediate driving gear 22 are mounted on the intermediate shaft 20, and the clutch 32 is mounted on the main shaft 30, and the intermediate shaft driven gear 21 is engaged with the primary gear 8 and the intermediate shaft driving gear 22 is engaged with the primary driven gear 33 of the clutch 32.

In this manner, a gear train for transmitting power between the crankshaft 5, the intermediate shaft 20 and the main shaft 30 outside the right case 11 can be assembled outside the right case 11 in a state where each of the shafts are positioned with respect to the crankcase. This can improve workability in assembling them. Further, since the intermediate shaft driven gear 21 and the intermediate shaft driving gear 22 are mounted in two steps, a speed reduction ratio can be freely set, and further, the distance between the intermediate shaft 20 and the crankshaft 5 and the distance between the intermediate shaft 20 and the main shaft 30 can be made smaller. Still further, since the intermediate shaft driven gear 21 having a larger diameter, is mounted at the crank room side, which is the inner side, and an intermediate shaft driving gear 22 having a smaller diameter, is mounted at the outer side thereof, there is not the possibility that the larger intermediate shaft driven gear 21 will interfere with the clutch 32 disposed on the main shaft 30.

Further, since the balancer weight 23 is mounted on the intermediate shaft 20 at the other end side projecting outside the left case 10, unlike inventions described in prior art where the balancer weight 23 is typically mounted inside the left case 10 and a balancer weight 23 and the crank web 6. Thus, the present invention increases the flexibility in the layout. Still further, since the balancer weight 23 is mounted on the side opposite to the side of the intermediate shaft 20 where the intermediate shaft driven gear 21 and the intermediate shaft driving gear 22 are mounted, the flexibility in the layout of the balancer weight 23 can be further increased. Still further, since the balancer weight 23 is mounted on the intermediate shaft 20 at the position farthest from the center of the engine, the distance from the center to the balancer weight 23 is made greater, resulting in a greater balancing effect for regulating lateral vibrations.

Figure 2:
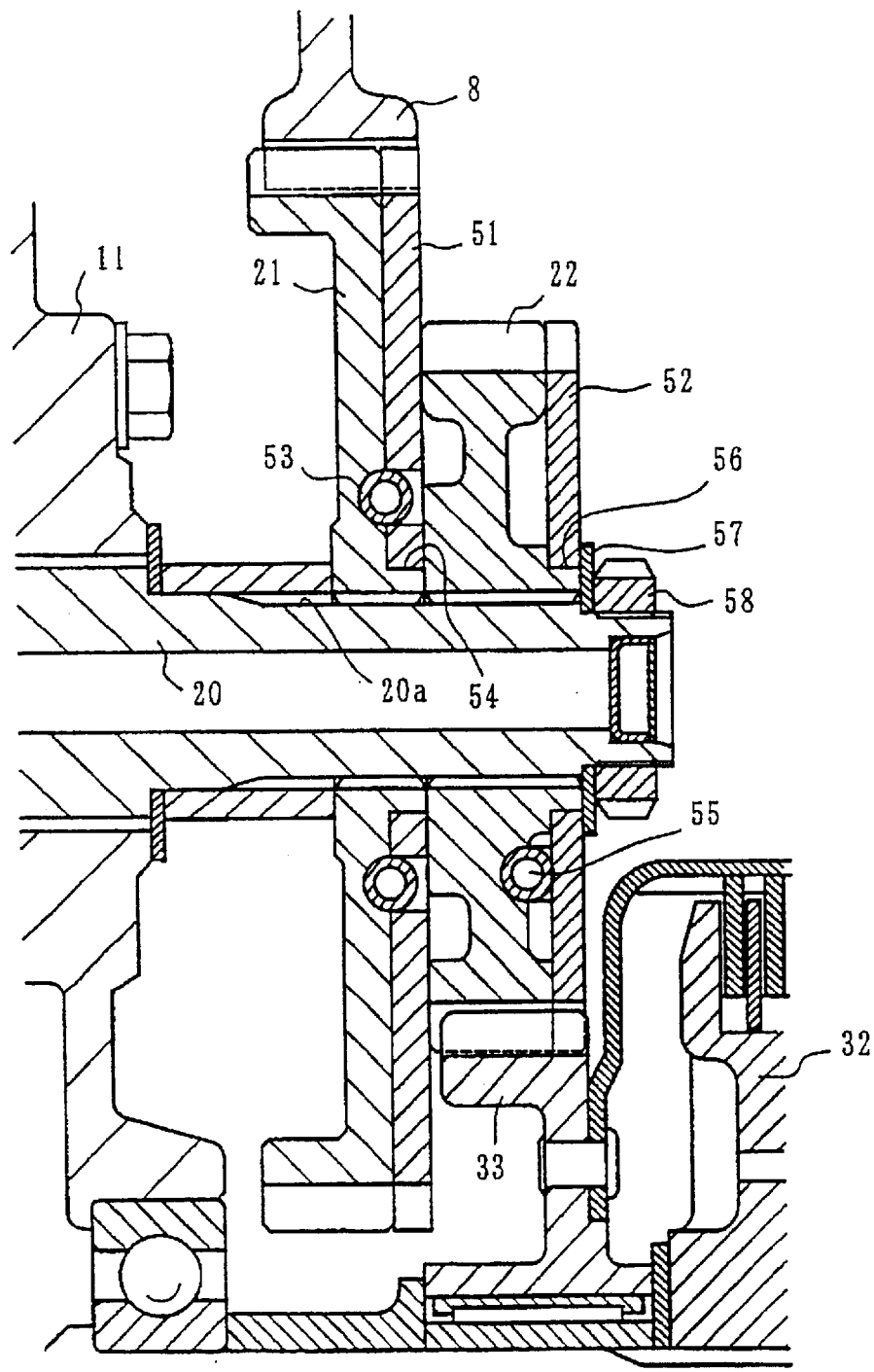
FIG. 2 is a cross-sectional view to show a part projecting from a right case of an intermediate shaft in accordance with the second preferred embodiment.

Next, a second embodiment of the present invention will be described on the basis of FIG. 2. In this connection, FIG. 2 is a cross-sectional view to show a portion of the intermediate shaft 20 projecting outside the right case 11, and like reference numerals are used for the parts common to those in the first preferred embodiment, and thus will be omitted. In this second embodiment, each of the intermediate shaft driven gear 21 and the intermediate shaft driving gear 22 is formed in a canceling structure. That is, a sub-gear 51 having an equivalent diameter and a narrower width with respect to the intermediate shaft driven gear 21, which is a main gear, is overlaid on the driven gear 21, and both the gears 51 and 21 are turned and urged in the direction opposite to each other by a coil spring 53 between both the gears 21 and 51. The intermediate shaft driven gear 21 is spline-coupled with the intermediate shaft 20 by the spline grooves 20a and is engaged with the primary gear 8 along with the sub-gear 51. The sub-gear 51 is fitted on the boss 54 of the intermediate shaft driven gear 21 such that it can turn with a play.

Further, the intermediate shaft driving gear 22 is also formed in the canceling structure and has a coil spring 55 disposed between intermediate shaft driving gear and the sub-gear 52. The sub-gear has an equivalent diameter and a narrower width with respect to the intermediate driving gear 22, and the sub-gear 52 is engaged with the primary driven gear 33 along with the intermediate shaft driving gear 22. The intermediate shaft driving gear 22 is spline-coupled with the intermediate shaft 20 by the spline grooves 20a and is fitted on the boss 56 of the intermediate shaft driving gear 22 such that it can turn with a play.

When assembling these gears, first, the intermediate shaft driven gear 21 is fitted on and spline-coupled with the intermediate shaft 20 and then the sub-gear 51 is fitted on the boss 54 of the intermediate shaft driven gear 21 with the coil spring 53 disposed on the side opposed to the sub-gear 51 to support the coil spring 53 between the intermediate shaft driven gear 21 and the sub-gear 51. Subsequently, the intermediate shaft driving gear 22 is fitted on and spline-coupled with the intermediate shaft 20, and then the sub-gear 52 is fitted on the boss 56 of the intermediate shaft driving gear 22. Here, the coil spring 55 is previously sandwiched between the intermediate shaft driving gear 22 and the sub-gear 52.

Thereafter, a nut 58 is fastened to the shaft end of the intermediate shaft 20 via a washer 57 to fix these four gears 21, 51, 22, and 52 in the thrust direction. Here, the sub-gear 51 is butted against and positioned by the side surfaces of the intermediate shaft driven gear 21 and the intermediate shaft driving gear 22. Therefore, since the sub-gear 51 can be positioned in the thrust direction by fixing the neighboring intermediate shaft driving gear 22 without using a special member, it is possible to reduce the number of the parts and to simplify the structure.

In this connection, the present invention is not limited to the preferred embodiments described above, and various modifications may be made within the spirit and scope of the present invention and, for example, a publicly type of continuously variable transmission can be adopted as the structure of the transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A structure for transmitting the power of an engine comprising:
   a crankshaft;
   an intermediate shaft;
   a main input shaft of a transmission; and
   an output shaft of the transmission;
   wherein each of said shafts is supported by a right case and a left case which constitute a crankcase, and
   wherein an intermediate shaft driven gear and an intermediate shaft driving gear are mounted adjacently in the axial direction on an end of the intermediate shaft in a position outside the crankcase, the intermediate shaft driven gear is engaged with a driving gear of the crankshaft, and the intermediate shaft driving gear is engaged with an input gear of the input shaft of the transmission.

2. The structure for transmitting the power of an engine according to claim 1, wherein at least one balancer weight is mounted on a portion of the intermediate shaft projecting outside the crankcase.

3. The structure for transmitting the power of an engine according to claim 1, wherein a sub-gear having the same diameter as the intermediate shaft driven gear is overlaid on the intermediate shaft driven gear, and a spring for turning both the intermediate driven gear and the sub-gear in the opposite direction is disposed between each of these gears to form a canceling structure.

4. The structure for transmitting the power of an engine according to claim 1, wherein the intermediate shaft driving gear, is formed in a canceling structure, and the intermediate shaft driving gear includes a sub-gear.

5. The structure for transmitting the power of an engine according to claim 1, wherein the intermediate shaft driven gear, the a sub-gear of the intermediate shaft driven gear, the intermediate shaft driving gear, and the a sub-gear of the intermediate driving gear are butted together and are fixed in a position of a thrust direction.

6. The structure for transmitting the power of an engine according to claim 1, wherein the diameter of the intermediate shaft driving gear is smaller than the diameter of the intermediate shaft driven gear.

7. The structure for transmitting the power of an engine according to claim 1, wherein the intermediate shaft driven gear is fitted on and spline-coupled with the intermediate shaft.

8. The structure for transmitting the power of an engine according to claim 1, wherein the intermediate shaft driving gear is fitted on and spline-coupled with the intermediate shaft.

9. The structure for transmitting the power of an engine according to claim 1, wherein the intermediate shaft driving gear is mounted adjacent to the intermediate shaft driven gear in two steps in an axial direction.

10. The structure for transmitting the power of an engine according to claim 2, wherein the balancer weight is disposed at a farthest end portion of the intermediate shaft and outside the crankcase, and away from a center of a crank web.

11. The structure for transmitting the power of an engine according to claim 3, wherein the sub-gear of the intermediate driven gear is narrower than the intermediate driven gear, and is fitted on a boss of the intermediate shaft driven gear with a coil spring disposed on a side opposed to the sub-gear to support the coil spring between the intermediate shaft driven gear and the sub-gear.

12. The structure for transmitting the power of an engine according to claim 4, wherein the sub-gear of the intermediate shaft driving gear is fitted on a boss of the intermediate shaft driving gear, with a coil spring sandwiched between the intermediate shaft driving gear and the sub-gear.

* * * * *